Patented Mar. 27, 1928.

1,663,916

UNITED STATES PATENT OFFICE.

ALWIN MITTASCH AND CARL MÜLLER, OF MANNHEIM, AND WALTER SCHUBARDT, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY.

MANUFACTURE OF PURE IRON.

No Drawing. Application filed May 12, 1926, Serial No. 108,683, and in Germany June 10, 1925.

Iron metal can be produced in a state of very high purity by decomposing iron carbonyl by heat to form iron and carbon monoxid. The iron metal so obtained which is in a powdery or spongy condition while free from other elements except possibly nickel or cobalt is sometimes contaminated with carbon and oxygen.

We have now found that this iron can be converted into practically pure iron metal by melting it while excluding air and other oxidizing gases, preferably after compressing the iron. In order to obtain the iron free from gas bubbles, melting may be carried out in vacuo and the molten metal may be finally exposed for a short time to ordinary or elevated pressure in an atmosphere of an indifferent gas, preferably of nitrogen or argon.

Melting is advantageously carried out immediately after the production of the powdery or spongy iron by arranging a bath of liquid iron below the reaction vessel employed for the decomposition of the iron carbonyl by heat, into which bath the finely divided iron is introduced directly.

In case it is not desired to produce pure iron in the molten state, it is sufficient to heat the impure iron preferably after being compressed, only to sintering i. e. about 500° C. or more. Also by this treatment carbon and oxygen are removed practically completely, provided the heating is continued sufficiently long. The time necessary therefor depends of course on the temperature and the percentage of the impurities.

For example, by decomposition of iron carbonyl vapor by heat, a spongy iron containing about 3 per cent of carbon and 4 per cent of oxygen was obtained. On melting this product in a crucible, iron of 99.9 per cent purity and containing only 0.03 per cent of carbon or even less was obtained.

What we claim is:

1. The process of producing practically pure iron which consists in heating iron obtained by decomposition of iron carbonyl and contaminated with carbon and oxygen, to a temperature of at least about 500° C., while excluding air and other oxidizing gases.

2. The process of producing practically pure iron which consists in melting iron obtained by decomposition of iron carbonyl and contaminated with carbon and oxygen, while excluding air and other oxidizing gases.

3. The process of producing practically pure iron which consists in melting iron obtained by decomposition of iron carbonyl and contaminated with carbon and oxygen, under reduced pressure and subsequently exposing the liquid iron to at least ordinary pressure in an atmosphere of an indifferent gas.

4. The process of producing practically pure iron, which consists in arranging a bath of liquid iron below the reaction vessel employed for the decomposition of iron carbonyl by heat, into which bath the finely divided iron is introduced directly, while excluding air and other oxidizing gases.

In testimony whereof we have hereunto set our hands.

ALWIN MITTASCH.
CARL MÜLLER.
WALTER SCHUBARDT.